(12) United States Patent
MacLellan et al.

(10) Patent No.: US 7,149,947 B1
(45) Date of Patent: Dec. 12, 2006

(54) METHOD OF AND SYSTEM FOR VALIDATING AN ERROR CORRECTION CODE AND PARITY INFORMATION ASSOCIATED WITH A DATA WORD

(75) Inventors: Christopher S. MacLellan, Walpole, MA (US); Paul G. Scharlach, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 463 days.

(21) Appl. No.: 10/654,852

(22) Filed: Sep. 4, 2003

(51) Int. Cl.
*H03M 13/00* (2006.01)
(52) U.S. Cl. .................................................. 714/758
(58) Field of Classification Search ................ 714/763, 714/758, 800; 371/37.4
See application file for complete search history.

(56) References Cited

U.S. PATENT DOCUMENTS

| | | | | |
|---|---|---|---|---|
| 5,644,583 A * | 7/1997 | Garcia et al. | ............... | 714/764 |
| 5,682,394 A * | 10/1997 | Blake et al. | ................ | 714/763 |
| 5,925,144 A * | 7/1999 | Sebaa | ......................... | 714/733 |
| 5,953,265 A | 9/1999 | Walton et al. | | |
| 6,048,090 A * | 4/2000 | Zook | ........................... | 714/755 |
| 6,397,357 B1 * | 5/2002 | Cooper | ....................... | 714/703 |
| 6,675,341 B1 * | 1/2004 | Chen et al. | ................. | 714/753 |
| 6,675,349 B1 * | 1/2004 | Chen | .......................... | 714/804 |
| 6,745,363 B1 * | 6/2004 | Poirier et al. | ............... | 714/763 |
| 6,757,862 B1 * | 6/2004 | Marianetti, II | .............. | 714/774 |
| 2003/0086306 A1 * | 5/2003 | Takahashi et al. | .......... | 365/200 |
| 2004/0133836 A1 * | 7/2004 | Williams | .................... | 714/746 |
| 2004/0210814 A1 * | 10/2004 | Cargnoni et al. | .......... | 714/758 |

* cited by examiner

*Primary Examiner*—Guy Lamarre
*Assistant Examiner*—Sam Rizk
(74) *Attorney, Agent, or Firm*—Krishnendu Gupta; Scott A. Ouellette

(57) ABSTRACT

A data processing system includes an input portion for receiving a digital word having N bits of data and M bits for error detection, a first error correction code generator for generating a first error correction code based on the N bits of data of the digital word and a second error correction code generator for generating a second error correction code based on the N bits of data of the digital word. A first logic operator performs a first logic operation on the first error correction code and the second error correction code to generate a data signature representative of a comparison of the first error correction code and the second error correction code and a second logic operator performs a second logic operation on the data signature and the M bits of the digital word to generate a constant signal representing a comparison of the data signature and the M bits of the digital word. A comparator compares the generated constant signal to a predetermined constant signal to determine if an error has occurred in at least one of the N bits of data in the digital word, the M bits of data in the digital word, the first error correction code and the second error correction code and an error signal generator generates an error signal indicating that an error has occurred in at least one of the N bits of data in the digital word, the M bits of data in the digital word, the first error correction code and the second error correction code if the generated constant signal is different from the predetermined constant signal.

54 Claims, 6 Drawing Sheets

| CHECK BIT | PARITY | DATA BITS OF THE DIGITAL WORD | | | | | | | |
|---|---|---|---|---|---|---|---|---|---|
| | | 0 | 1 | 2 | 3 | 4 | 5 | 6 | 7 |
| (C)ECC$_0$ | EVEN (XOR) | X | A | A | X | X | A | X | X |
| (C)ECC$_1$ | EVEN (XOR) | X | X | A | X | A | X | X | A |
| (C)ECC$_2$ | EVEN (XOR) | A | X | X | A | X | A | X | A |
| (C)ECC$_3$ | EVEN (XOR) | A | A | X | X | A | X | A | X |

FIG. 6

METHOD OF AND SYSTEM FOR VALIDATING AN ERROR CORRECTION CODE AND PARITY INFORMATION ASSOCIATED WITH A DATA WORD

FIELD OF THE INVENTION

This invention relates generally to a method of and system for validating error correction code and parity information associated with a data word and more particularly to a method of and system for validating proper generation of error correction codes when the data over which the error correction code is generated is originally protected by simple parity.

BACKGROUND OF THE INVENTION

During the high-speed transmission of digital data through a computer system such as a data storage device or communication system, it is extremely important to monitor the digital data for errors and to be able to correct any errors that may occur. Typical schemes for checking for errors and, in some cases, correcting errors, include the use of parity bits and error correction codes (ECC). Several methods incorporate both schemes in order to provide redundant error checking in the data transmission system.

One example of such a system is shown at 10 in FIG. 1. In system 10, the data is transmitted from upstream logic 12 to downstream logic 20. The data, along with the associated parity bits, are transmitted to a parity checker 14 which compares the parity of the transmitted data word with the parity bits to determine whether an error has occurred in either the data or the parity bits. The data, without the parity bits, is also transmitted to ECC generator 16, which generates an error correction code in accordance with known algorithms. The data with ECC is then transmitted to downstream logic 20. While this system incorporates both parity and ECC error detection schemes, it is still vulnerable to undetected errors because the data travels in separate paths to the parity checker 14 and the ECC generator 16. For example, if an error in the data were to occur at point 18, the parity checker 14 would indicate correct parity, but the ECC generated by the ECC generator 16 would be based on faulty data and would thus be incorrect. A similar error could occur if the data was corrupted in the path to the parity checker 14, if the corruption resulted in incorrect parity.

Another example of a system incorporating parity and ECC error checking schemes is shown at 30 in FIG. 2. Similar to system 10 of FIG. 1, system 30 transmits data from upstream logic 32 to downstream logic 42 and the parity of the data is checked in parity checker 34. However, in this system, the data is passed through two separate ECC generators 36, 38 and the resulting ECCs are compared to each other in comparator 40 before being passed to the downstream logic 40. This system 30 would be likely to detect any errors that occurred in the data downstream of intersection 44, since, if the data is corrupted in either of branches 46 and 48, the resulting ECC codes from ECC generators 36, 38 would be different and if the data is corrupted in branch 50, the parity checker 34 will detect a change in parity of the data. However, if the data is corrupted at point 52, both ECC generators will generate the same, incorrect ECC and, depending on the parity of the incorrect data, the parity checker 34 might not detect the error.

SUMMARY OF THE INVENTION

The present invention provides a method of and system for validating error correction codes that are generated for the purpose of indicating whether errors are present in digital words transmitted throughout a computer system by combining the parity checker and the generation of the ECCs. The system generates a first error correction code for a digital word using an error correction code generating scheme such as a modified Hamming code. A second error correction code is generated using an inverted version of the error correction code generating scheme used to generate the first error correction code. The first and second error correction codes are logically compared to generate a data signature that is then logically compared to the parity information associated with the original digital word. The result of this logical comparison is compared to a predetermined constant to determine whether an error is present in the original data word, in the parity, in the first error correction code or in the second error correction code.

According to a first embodiment of the invention, a method for operating a data processing system includes:

A. receiving a digital word having N bits of data and M bits for error detection;

B. generating a first error correction code based on the N bits of data of the digital word;

C. generating a second error correction code based on the N bits of data of the digital word;

D. performing a first logic operation on the first error correction code and the second error correction code to generate a data signature representative of a comparison of the first error correction code and the second error correction code;

E. performing a second logic operation on the data signature and the M bits of the digital word to generate a constant signal representing a comparison of the data signature and the M bits of the digital word;

F. comparing the generated constant signal to a predetermined constant signal to determine if an error has occurred in at least one of the N bits of data in the digital word, the M bits of data in the digital word, the first error correction code and the second error correction code; and G. determining that an error has occurred in at least one of the N bits of data in the digital word, the M bits of data in the digital word, the first error correction code and the second error correction code if the generated constant signal is different from the predetermined constant signal.

The first error correction code may include Y bits, wherein each one of the Y bits may be generated by performing a third logic operation on predetermined bit sets of the digital word. At least two of the Y bits of the first error correction code may be generated by performing the third logic operation on different predetermined bit sets of the digital word. The second error correction code may include Y bits, wherein each one of the Y bits of the second error correction code may be generated by performing a fourth logic operation on bits of the digital word which are not included in the predetermined bit set of the digital word used to generate a corresponding bit of the first error correction code. The M bits of the digital word for error correction may be parity bits. The predetermined constant signal may include Z bits, all of which being one of all zeros and all ones. The generated constant signal may include Z bits and, if no errors are present in at least one of the N bits of data in the digital word, the M bits of data in the digital word, the first error correction code and the second error correction code, all of the Z bits of the generated constant signal are one of all zeros and all ones. The first logic operation and the second logic operation each may be an XOR operation. The third logic operation and the fourth logic operation each may be one of an XOR operation and an XNOR operation. If no errors are present in the N bits of the digital word, the second error correction code may be one of identical to the first error correction code and opposite to the first error correction code. If no errors are present in the N bits of the digital word, the digital signature may include one of all zeros and all ones. If the N bits of the digital word are even, and if no errors are present in the N bits of the digital word, the digital signature may include all zeros. If the N bits of the digital word are odd, and if no errors are present in the N bits of the digital word, the digital signature may include all ones. If the N bits of the digital word are even, and if no errors are present in the N bits of the digital word, the second error correction code may be identical to the first error correction code. If the N bits of the digital word are odd, and if no errors are present in the N bits of the digital word, the second error correction code may be opposite the first error correction code.

According to another embodiment of the invention, a data processing system includes an input portion for receiving a digital word having N bits of data and M bits for error detection; a first error correction code generator for generating a first error correction code based on the N bits of data of the digital word; a second error correction code generator for generating a second error correction code based on the N bits of data of the digital word; a first logic operator for performing a first logic operation on the first error correction code and the second error correction code to generate a data signature representative of a comparison of the first error correction code and the second error correction code; and a second logic operator for performing a second logic operation on the data signature and the M bits of the digital word to generate a constant signal representing a comparison of the data signature and the M bits of the digital word. The system further includes a comparator for comparing the generated constant signal to a predetermined constant signal to determine if an error has occurred in at least one of the N bits of data in the digital word, the M bits of data in the digital word, the first error correction code and the second error correction code; and an error signal generator for generating an error signal indicating that an error has occurred in at least one of the N bits of data in the digital word, the M bits of data in the digital word, the first error correction code and the second error correction code if the generated constant signal is different from the predetermined constant signal.

According to another embodiment of the invention, a method for operating a data processing system includes:

A. receiving a digital word having N bits of data and M bits for error detection;

B. generating a primary error correction code based on the N bits of data of the digital word;

C. generating a complementary error correction code based on the N bits of data of the digital word;

D. performing a first logic operation on the primary error correction code and the complementary error correction code to generate a data signature representative of a comparison of the primary error correction code and the complementary error correction code;

E. determining whether an error has occurred in at least one of the N bits of the digital word, the primary error correction code and the complementary error correction code based on the value of the data signature.

The method may further include:

F. performing a second logic operation on the data signature and the M bits of the digital word to generate a constant signal representing a comparison of the data signature and the M bits of the digital word; and G. comparing the generated constant signal to a predetermined constant signal to determine if an error has occurred in at least one of the N bits of data in the digital word, the M bits of data in the digital word, the primary error correction code and the complementary error correction code;

H. determining that an error has occurred in at least one of the N bits of data in the digital word, the M bits of data in the digital word, the primary error correction code and the complementary error correction code if the generated constant signal is different from the predetermined constant signal.

According to yet another embodiment, a data processing system includes an input portion for receiving a digital word having N bits of data and M bits for error detection; a primary error correction code generator for generating a primary error correction code based on the N bits of data of the digital word; and a complementary error correction code generator for generating a complementary error correction code based on the N bits of data of the digital word. The system further includes a first logic operator for performing a first logic operation on the primary error correction code and the complementary error correction code to generate a data signature representative of a comparison of the primary error correction code and the complementary error correction code; and an error detection device which detects whether an error has occurred in at least one of the N bits of the digital word, the primary error correction code and the complementary error correction code based on the value of the data signature.

The system may further include a second logic operator for performing a second logic operation on the data signature and the M bits of the digital word to generate a constant signal representing a comparison of the data signature and the M bits of the digital word; a comparator for comparing the generated constant signal to a predetermined constant signal to determine if an error has occurred in at least one of the N bits of data in the digital word, the M bits of data in the digital word, the primary error correction code and the complementary error correction code; and an error signal generator for generating an error signal indicating that an error has occurred in at least one of the N bits of data in the digital word, the M bits of data in the digital word, the primary error correction code and the complementary error correction code if the generated constant signal is different from the predetermined constant signal.

BRIEF DESCRIPTION OF THE DRAWINGS

These and other features of the invention will become more readily apparent from the following detailed description when read together with the accompanying drawings, in which:

FIG. 6 is a table showing an example of an error correction code generation scheme.

DETAILED DESCRIPTION

Figure 1:
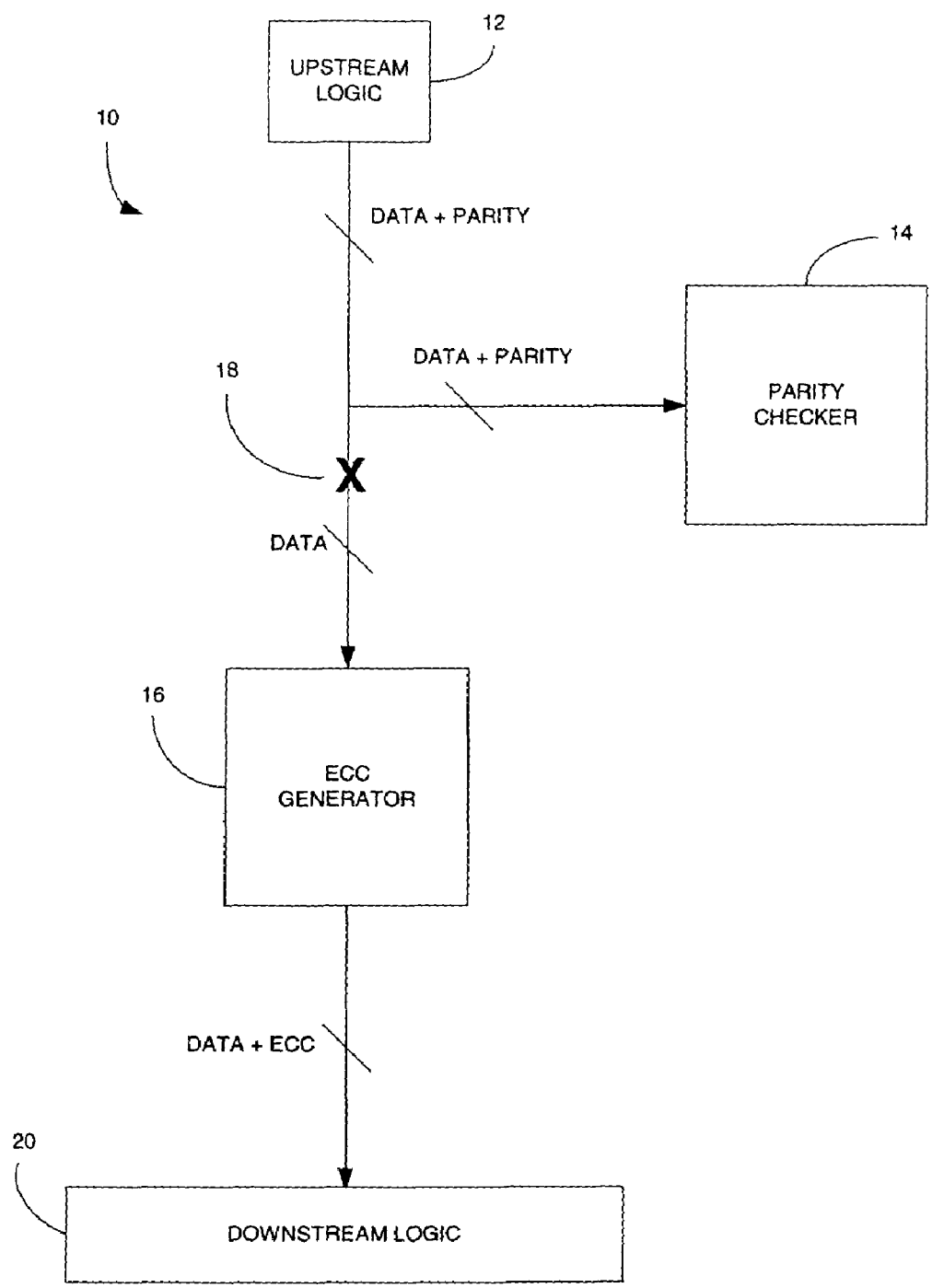
FIG. 1 is a schematic block diagram of a prior art data error checking system.
Figure 2:
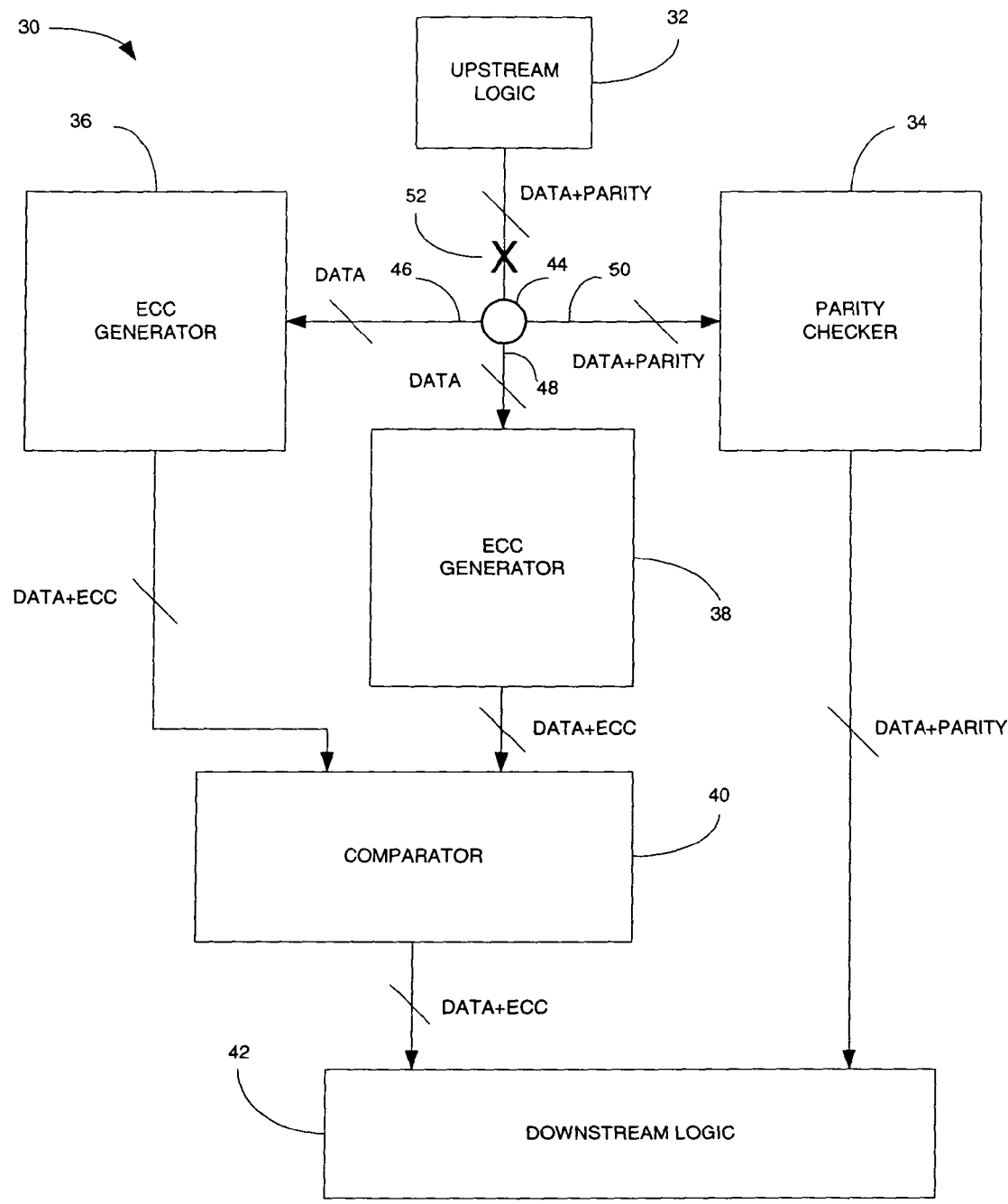
FIG. 2 is a schematic block diagram of another prior art data error checking system.
Figure 3:
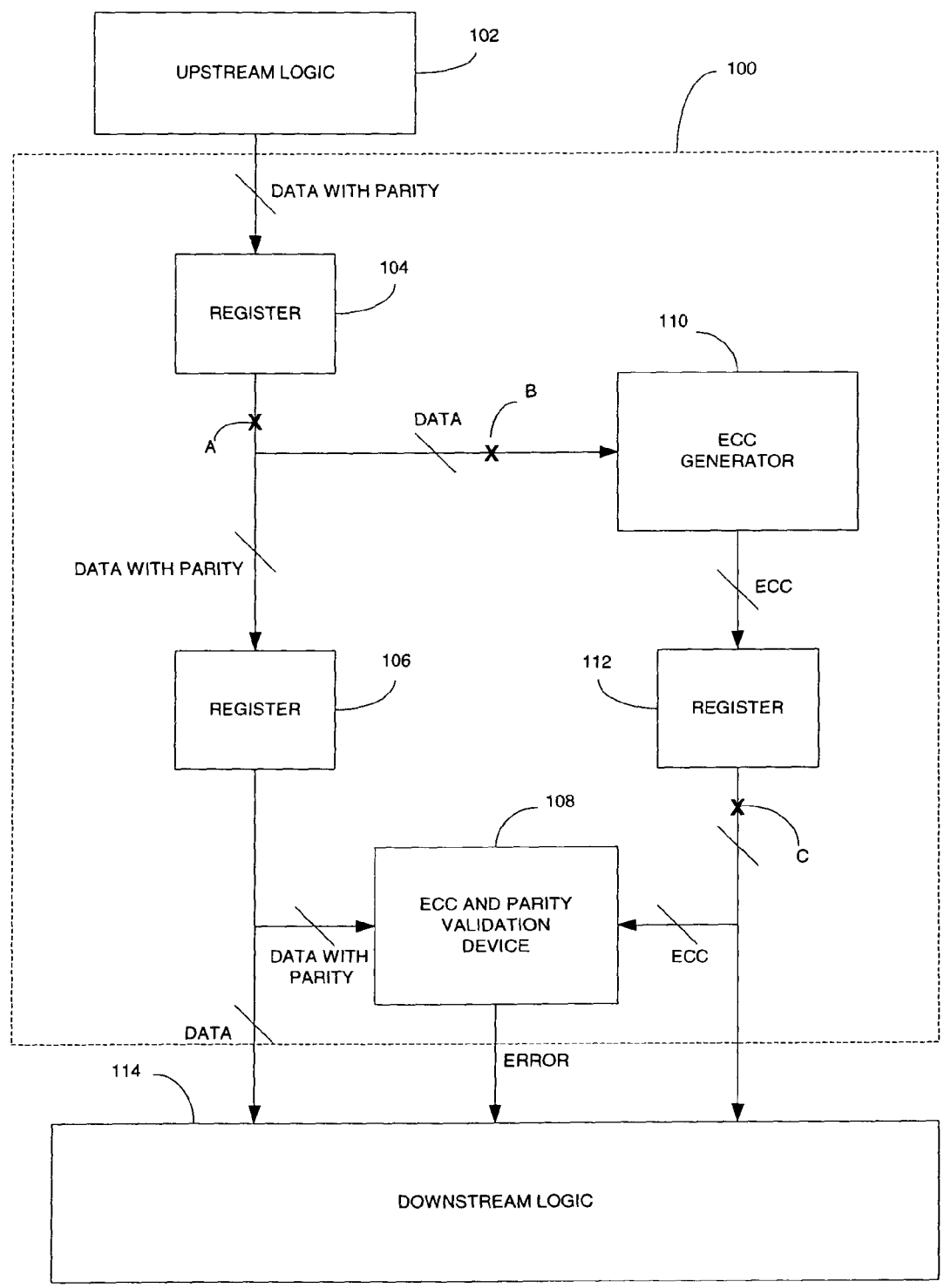
FIG. 3 is a schematic block diagram of an error correction code validation system in accordance with the present invention.

One embodiment of the error correction code validation system of the present invention is shown at 100 in FIG. 3. A data word with parity information received from the upstream logic 102 is transmitted through registers 104 and 106 before it is input to ECC and parity validation device 108. The data word without parity is also transmitted from the register 106 to the downstream logic 114.

The data word without the parity is transmitted from register 104 to the ECC generator 110, where the ECC for the data word is generated in a manner known in the art. In the preferred embodiment, the ECC is generated using a modified Hamming generation scheme. It will be understood, however, that any type of ECC generation scheme may be utilized by the ECC generator 110, such as Reed-Solomon codes, etc. The ECC is then transmitted from the ECC generator 110 through a register 112 and to the ECC and parity validation device 108. As shown in FIG. 3, the ECC is also transmitted to the downstream logic 114.

While registers 104, 106 and 112 are included in the preferred embodiment for the purpose of synchronizing the flow of data through the system 100, it will be understood that these registers are not essential to the operation of the invention and may be omitted.

Figure 4:
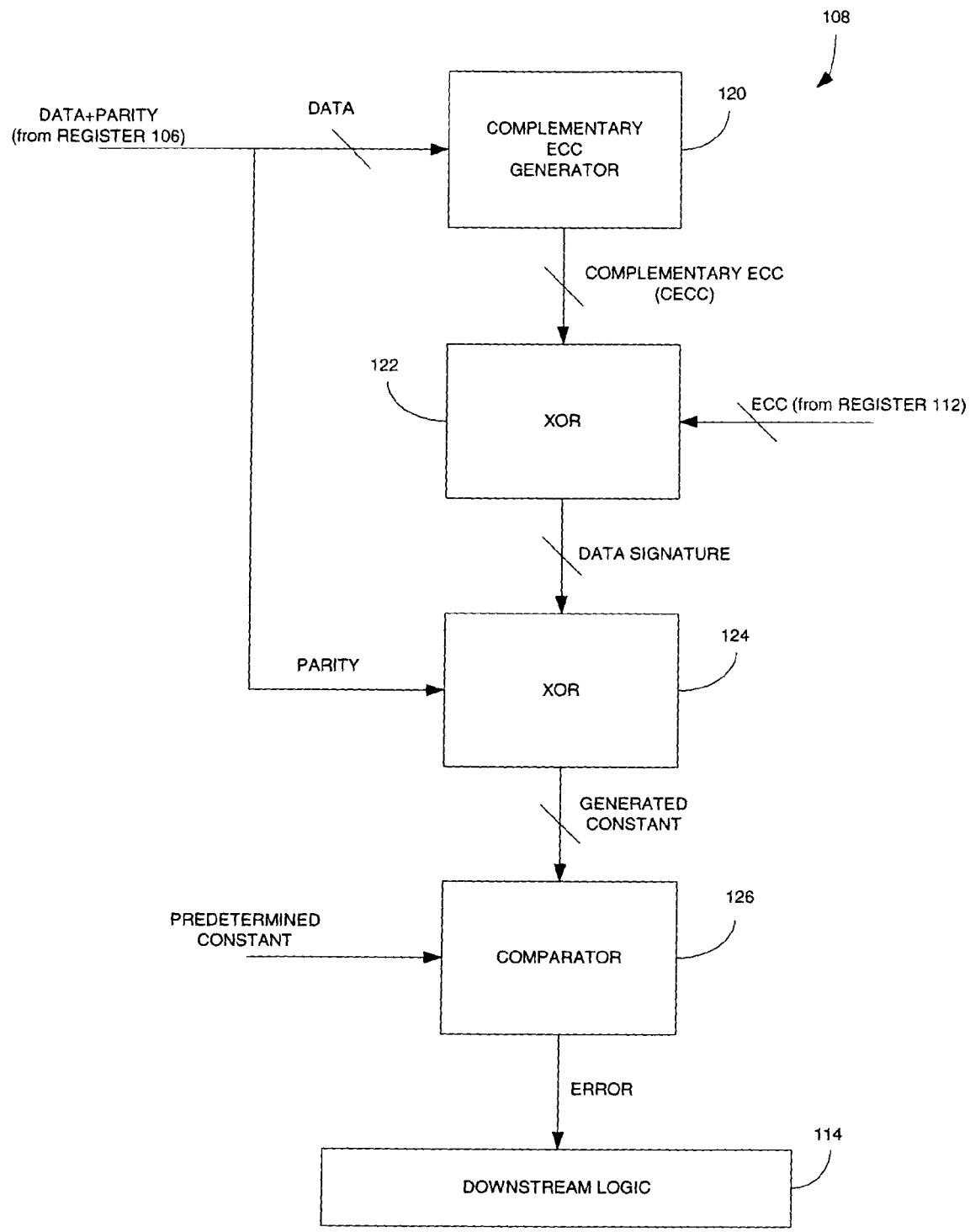
FIG. 4 is a detailed schematic block diagram of the ECC and parity validation device of FIG. 3.

The ECC and parity validation device 108 is shown in greater detail in FIG. 4. The ECC and parity validation device 108 includes a complementary ECC (CECC) generator 120, which receives the data-only portion of the digital data word from register 106. The CECC generator generates a complementary ECC based on the same ECC generation scheme utilized by the ECC generator 110 to generate the ECC. The details of the operation of the CECC generator 120 are described below with reference to FIGS. 5 and 6.

The complementary ECC generated by the complementary ECC generator 120 is input to an XOR operator 122 where an exclusive-or operation is performed on the CECC and the ECC input to the XOR operator from register 112. The result of the XOR operation is the data signature, which typically includes the same number of bits as the ECC and the CECC. The data signature is then input to an XOR operator 124 where an exclusive-or operation is performed on the data signature and the parity bit or bits input to the XOR operator from register 104. The result of the XOR operation is a generated constant, which also typically includes the same number of bits as the ECC and the CECC. Finally, the generated constant is compared to a predetermined constant in comparator 126. The predetermined constant is hard-coded in logic (not shown) and typically includes the same number of bits as the generated constant. As described below, the predetermined constant typically includes all 1's or all 0's. In the preferred embodiment, the comparator 126 performs an exclusive-or operation on the generated constant and the predetermined constant and then performs and OR reduction of the result to produce a single bit error signal output, which typically is a logic 1 if an error is present in either the original data word, the parity, the ECC or the CECC. A logic 0 is output if no error is detected. The error signal is output to the downstream logic 114.

Figure 5:
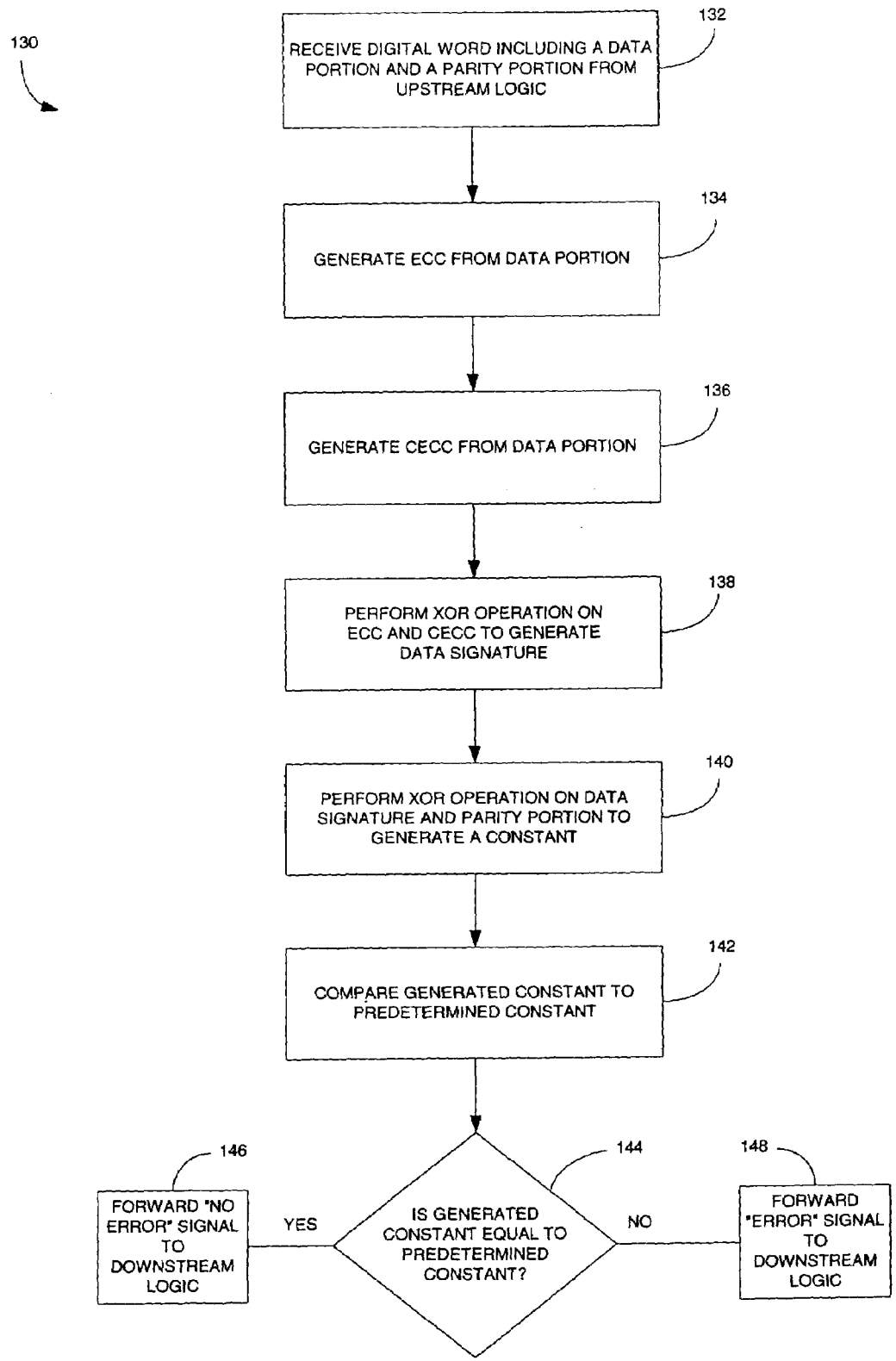
FIG. 5 is a flow diagram showing the steps performed by the error correction code validation system in accordance with the present invention.

Referring now to FIGS. 5 and 6, the operation of the ECC and parity validation device 108 will be described. FIG. 5 shows a flow diagram 130 of the steps carried out by the ECC and parity validation device 108 and FIG. 6 shows a table 150 of an example of an ECC generation scheme that may be utilized by the ECC generator 110 and the CECC generator 120. Table 150 shows an ECC generation scheme for an 8-bit data word. While data systems which will utilize the device of the present invention typically operate on data words of up to 64-bits or larger, for the sake of simplicity, the invention will be described as it applies to the validation of the ECC and parity associated with an 8-bit data word. Those skilled in the art will understand how to scale the invention to apply to larger data words.

As is known in the art, a 4-bit ECC is required for error detection and single fault correction for an 8-bit data word. These "check bits" are labeled (C)ECC$_0$–(C)ECC$_3$ in table 150. Each bit in the data word is numbered from 0–7, with the "0" bit being the most significant bit and the "7" bit being the least significant. To generate each check bit, the bits indicated with an "X" in each row associated with a particular check bit are combined using the logic operation shown in the "parity" column. For example, to form check bit ECC$_0$, an XOR operation is performed on the bits numbered 0, 3, 4, 6 and 7 of the data word. It will be understood that, in addition to the XOR operation, other logic operations, such as the XNOR operation, for example, may be used to generate each check bit.

In accordance with the invention, each check bit of the complementary ECC (CECC) is formed by performing the logic operation indicated in the "parity" column on the bits not included in the ECC generation operation for that check bit. These bits are indicated with an "A" in each row associated with a particular check bit CECC. For example, to form check bit CECC$_0$, an XOR operation is performed on the bits numbered 1, 2 and 5 of the data word.

Several examples of the operation of a preferred embodiment of the invention will now be described.

Example 1

In Step 132 of FIG. 5, a digital word including a data portion and a parity portion is received in register 104 from upstream logic 102. For the purpose of this example, the data portion of received data word is 01100110 and the parity portion is a single bit 1, based on an odd parity scheme. Below is the data word and, for the purpose of demonstrating the generation of the ECC and CECC bits according to table 150, an indication of the number 0–7 of each bit and the parity bit P:

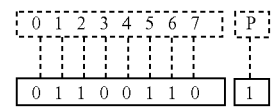

The data portion of the data word is input to ECC generator 110, which generates the ECC by performing the indicated operation on the indicated bits for each bit of the ECC, Step 134. The operation for each bit ECC$_0$ to ECC$_4$ is as follows:

ECC$_0$=0 XOR 0 XOR 0 XOR 1 XOR 0=1
ECC$_1$=0 XOR 1 XOR 0 XOR 1 XOR 1=1
ECC$_2$=1 XOR 1 XOR 0 XOR 1=1
ECC$_3$=1 XOR 0 XOR 1 XOR 0=0

Therefore, the ECC output from ECC generator 110 is 1110.

The data with parity is input to the ECC and parity validation device 108 through register 106, and the data portion is input to complementary ECC (CECC) generator 120, which generates the CECC by performing the indicated operation on the indicated bits for each bit of the CECC, Step 136. The operation for each bit $CECC_0$ to $CECC_3$ is as follows:

$CECC_0$=1 XOR 1 XOR 1=1
$CECC_1$=1 XOR 0 XOR 0=1
$CECC_2$=0 XOR 0 XOR 1 XOR 0=1
$CECC_3$=0 XOR 1 XOR 0 XOR 1=0

Therefore the CECC output from CECC generator 120 is 1110.

The ECC and CECC are input to XOR operator 122 which performs an exclusive-or operation on the codes to generate the data signature, Step 138. Performing an XOR operation on the ECC (1110) and the CECC (1110) yields a data signature of 0000.

The data signature and the parity portion of the data word are input to XOR operator 124 to generate the generated constant, Step 140. Performing an XOR operation on each bit of the data signature (0000) and the parity portion (1) yields a generated constant of 1111. The generated constant is then input to comparator 126 where it is compared to the predetermined constant, Step 142. As discussed above, the comparator 126 comprises an XOR operation and then an OR reduction of the syndrome to produce a 1 bit output. The XOR of the generated constant (1111) and our predetermined constant, which is 1111 for this example, yields a syndrome 0000, indicating that the generated constant is equal to the predetermined constant, Step 144. The OR reduction of this syndrome yields an output of "0", indicating that no error has occurred in each of the data word, the parity, the ECC and the CECC, Step 146. If an error had occurred, as will be shown in an example below, the OR reduction would result in an error output of "1", indicating that an error had occurred, Step 148.

The above example showed how the invention applies to the validation of a data word having even parity. Typically, when the data portion of the data word is even, the ECC and the CECC will be identical, if no errors have occurred. This results in a data signature of 0000. As is shown in the example below, in the case of a data word having odd parity, each bit of the ECC will be the opposite of the corresponding bit in the CECC, resulting in a data signature of 1111. In either case, Step 140, FIG. 5, determines whether an error has occurred in the parity bit since, in the case of the even data word, each bit of the data signature (0000) is XORed with the parity bit (1), resulting in a generated constant (1111). In the case of the odd data word, each bit of the data signature (1111) is XORed with the parity bit (0), also resulting in a generated constant (1111).

Example 2

An example of the operation of the invention when processing an odd data word follows. If the data word received in register 104 is:

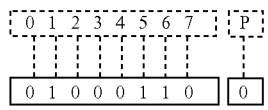

the operation for each bit $ECC_0$ to $ECC_3$ is as follows:
$ECC_0$=0 XOR 0 XOR 0 XOR 1 XOR 0=1
$ECC_1$=0 XOR 1 XOR 0 XOR 1 XOR 1=1
$ECC_2$=1 XOR 0 XOR 0 XOR 1=0
$ECC_3$=0 XOR 0 XOR 1 XOR 0=1

Therefore, the ECC output from ECC generator 110 is 1101.

The operation for each bit $CECC_0$ to $CECC_3$ is as follows:
$CECC_0$=1 XOR 0 XOR 1=0
$CECC_1$=0 XOR 0 XOR 0=0
$CECC_2$=0 XOR 0 XOR 1 XOR 0=1
$CECC_3$=0 XOR 1 XOR 0 XOR 1=0

Therefore the CECC output from CECC generator 120 is 0010.

Performing an XOR operation on the ECC (1101) and the CECC (0010) yields a data signature of 1111. Performing an XOR operation on each bit of the data signature (1111) and the parity portion (O) yields a generated constant of 1111. The generated constant is then compared to the predetermined constant. As discussed above, the comparator 126 comprises an XOR operation and then an OR reduction of the syndrome to produce a 1 bit output. The XOR of the generated constant (1111) and our predetermined constant (1111) yields a syndrome 0000, indicating that the generated constant is equal to the predetermined constant. The OR reduction of this syndrome yields an output of "0", indicating that no error has occurred in each of the data word, the parity, the ECC and the CECC.

Example 3

An example of an error in the data portion of the data word will now be described. If, at point A of FIG. 3, the correct data word is:

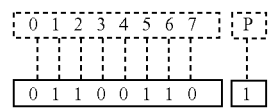

but, through a transmission error, the same data word at point B is:

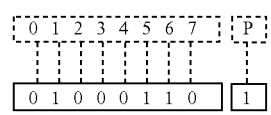

i.e., bit number 2 has flipped from a 1 to a 0, the invention operates as follows:

Since the incorrect data word at B (01000110) is input to the ECC generator 110, using the generation scheme shown in table 150 of FIG. 6, the ECC will be 1101. The correct data word at A (01100110) is input to the CECC generator 120, resulting in a CECC of 1110. The XOR operation in operator 122 yields a data signature of 0011. The XOR operation in operator 124 yields a generated constant of 1100. In comparator 126, the syndrome of the generated constant (1100) and the predetermined constant (1111) is 0011. The OR reduction of this syndrome yields an error signal of 1, indicating that an error has occurred.

Example 4

If there are no errors in the data word and both the ECC generator 110 and the CECC generator 120 receive the same data word, but the ECC generated in the ECC generator is incorrect, the following occurs:

If the data word is the same as in Example 1:

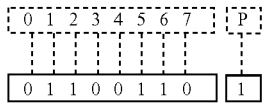

the output of the CECC generator will be 1110. However, assume an error occurs in the generation of the ECC by the ECC generator 110 or if the ECC is corrupted at point C before it is input to the ECC and parity validation device 108, and the ECC input is 1100, i.e., the check bit $ECC_2$ has flipped from a 1 to a 0. In this case, the data signature output from XOR operator 122 will be 0010. The generated constant output from XOR operator 124 will be 1101, which, when compared to the predetermined constant 1111, will result in an error signal 1 output to the downstream logic 114.

Example 5

In Example 1, if the parity bit was incorrectly flipped from a 1 to a 0, the generated constant, resulting from the XOR operation performed on the data signature (0000) and the parity bit (0) in XOR operator 124, would be 0000, which, when compared to the predetermined constant 1111, would result in a syndrome of 1111. The OR reduction would yield an error signal of 1, indicating the error.

Accordingly, the present invention provides a system and method for validating the ECC and parity information associated with a data word. The validation of the ECC and parity information is performed within a single operation, such that an error in the data word, the parity or the ECC is indicated with a single output to the downstream logic.

While the invention has been described using an 8-bit data word having a single parity bit, it will be understood that any length data word having any number of parity bits can be processed in accordance with the invention.

Other embodiments are within the spirit and scope of the appended claims.

The invention claimed is:

1. A method for operating a memory system comprising:
   A. receiving a digital word having N bits of data and M bits for error detection;
   B. generating a first error correction code based on the N bits of data of the digital word;
   C. generating a second error correction code based on the N bits of data of the digital word;
   D. performing a first logic operation on the first error correction code and the second error correction code to generate a data signature representative of a comparison of the first error correction code and the second error correction code;
   E. performing a second logic operation on the data signature and the M bits of the digital word to generate a constant signal representing a comparison of the data signature and the M bits of the digital word;
   F. comparing the generated constant signal to a predetermined constant signal to determine if an error has occurred in at least one of the N bits of data in the digital word, the M bits of data in the digital word, the first error correction code and the second error correction code; and
   G. determining that an error has occurred in the N bits of data in the digital word, the M bits of data in the digital word, the first error correction code or the second error correction code if the generated constant signal is different from the predetermined constant signal.

2. The method of claim 1 wherein the first error correction code includes Y bits, wherein each one of the Y bits is generated by performing a third logic operation on predetermined bit sets of the digital word.

3. The method of claim 2 wherein at least two of the Y bits of the first error correction code are generated by performing the third logic operation on different predetermined bit sets of the digital word.

4. The method of claim 3 wherein the second error correction code includes Y bits, wherein each one of the Y bits of the second error correction code is generated by performing a fourth logic operation on bits of the digital word which are not included in the predetermined bit set of the digital word used to generate a corresponding bit of the first error correction code.

5. The method of claim 1 wherein the M bits of the digital word for error correction are parity bits.

6. The method of claim 4 wherein the predetermined constant signal comprises Z bits, all of which being one of either all zeros or all ones.

7. The method of claim 6 wherein the generated constant signal comprises Z bits and, if no errors are present in the N bits of data in the digital word, the M bits of data in the digital word, the first error correction code or the second error correction code, all of the Z bits of the generated constant signal are either all zeros or all ones.

8. The method of claim 7 wherein the first logic operation is an XOR operation.

9. The method of claim 8 wherein the second logic operation is an XOR operation.

10. The method of claim 9 wherein the third logic operation is one of an XOR operation and an XNOR operation.

11. The method of claim 10 wherein the fourth logic operation is one of an XOR operation and an XNOR operation.

12. The method of claim 4 wherein if no errors are present in the N bits of the digital word, the second error correcting code is either identical to the first error correcting code or complement to the first error correcting code.

13. The method of claim 4 wherein if no errors are present in the N bits of the digital word, the digital signature comprises either all zeros or all ones.

14. The method of claim 13 wherein if the N bits of the digital word are even, and if no errors are present in the N bits of the digital word, the digital signature comprises all zeros.

15. The method of claim 13 wherein if the N bits of the digital word are odd, and if no errors are present in the N bits of the digital word, the digital signature comprises all ones.

16. The method of claim 12 wherein if the N bits of the digital word are even, and if no errors are present in the N bits of the digital word, the second error correcting code is identical to the first error correcting code.

17. The method of claim 12 wherein if the N bits of the digital word are odd, and if no errors are present in the N bits of the digital word, the second error correcting code is the complement of the first error correcting code.

18. A memory system comprising:
   an input portion for receiving a digital word having N bits of data and M bits for error detection;
   a first error correction code generator for generating a first error correction code based on the N bits of data of the digital word;

a second error correction code generator for generating a second error correction code based on the N bits of data of the digital word;

a first logic operator for performing a first logic operation on the first error correction code and the second error correction code to generate a data signature representative of a comparison of the first error correction code and the second error correction code;

a second logic operator for performing a second logic operation on the data signature and the M bits of the digital word to generate a constant signal representing a comparison of the data signature and the M bits of the digital word; and a comparator for comparing the generated constant signal to a predetermined constant signal and generating an error signal indicating that an error has occurred in the N bits of data in the digital word, the M bits of data in the digital word, the first error correction code or the second error correction code.

19. The system of claim 18 wherein the first error correction code includes Y bits, wherein the first error correction code generator generates each one of the Y by performing a third logic operation on predetermined bit sets of the digital word.

20. The system of claim 19 wherein the first error correction code generator generates at least two of the Y bits of the first error correction code by performing the third logic operation on different predetermined bit sets of the digital word.

21. The system of claim 20 wherein the second error correction code includes Y bits, wherein the second error correction code generator generates each one of the Y bits of the second error correction code by performing a fourth logic operation on bits of the digital word which are not included in the predetermined bit set of the digital word used to generate a corresponding bit of the first error correction code.

22. The system of claim 18 wherein the M bits of the digital word for error correction are parity bits.

23. The system of claim 21 wherein the predetermined constant signal comprises Z bits, all of which being either all zeros or all ones.

24. The system of claim 23 wherein the generated constant signal comprises Z bits and, if no errors are present in the N bits of data in the digital word, the M bits of data in the digital word, the first error correction code ad or the second error correction code, all of the Z bits of the generated constant signal are either all zeros or all ones.

25. The system of claim 24 wherein the first logic operation is an XOR operation.

26. The system of claim 25 wherein the second logic operation is an XOR operation.

27. The system of claim 26 wherein the third logic operation is one of an XOR operation and an XNOR operation.

28. The system of claim 27 wherein the fourth logic operation is one of an XOR operation and an XNOR operation.

29. The method of claim 21 wherein if no errors are present in the N bits of the digital word, the second error correcting code is either identical to the first error correcting code or complement to the first error correcting code.

30. The system of claim 21 wherein if no errors are present in the N bits of the digital word, the digital signature comprises either all zeros or all ones.

31. The system of claim 30 wherein if the N bits of the digital word are even, and if no errors are present in the N bits of the digital word, the digital signature comprises all zeros.

32. The system of claim 30 wherein if the N bits of the digital word are odd, and if no errors are present in the N bits of the digital word, the digital signature comprises all ones.

33. The method of claim 29 wherein if the N bits of the digital word are even, and if no errors are present in the N bits of the digital word, the second error correcting code is identical to the first error correcting code.

34. The method of claim 29 wherein if the N bits of the digital word are odd, and if no errors are present in the N bits of the digital word, the second error correcting code is the complement of the first error correcting code.

35. A method for operating a memory system comprising:
A. receiving a digital word having N bits of data and M bits for error detection;
B. generating a primary error correction code based on the N bits of data of the digital word;
C. generating a complementary error correction code based on the N bits of data of the digital word;
D. performing a first logic operation on the primary error correction code and the complementary error correction code to generate a data signature representative of a comparison of the primary error correction code and the complementary error correction code;
E. determining whether an error has occurred in the N bits of the digital word, the primary error correction code or the complementary error correction code based on the value of the data signature.

36. The method of claim 35 wherein Step E includes:
performing a second logic operation on the data signature and the M bits of the digital word to generate a constant signal representing a comparison of the data signature and the M bits of the digital word;
comparing the generated constant signal to a predetermined constant signal; and
determining that an error has occurred in the N bits of data in the digital word, the M bits of data in the digital word, the primary error correction code or the complementary error correction code if the generated constant signal is different from the predetermined constant signal.

37. The method of claim 36 wherein the primary error correction code includes Y bits, wherein each one of the Y bits is generated by performing a third logic operation on predetermined bit sets of the digital word.

38. The method of claim 37 wherein at least two of the Y bits of the primary error correction code are generated by performing the third logic operation on different predetermined bit sets of the digital word.

39. The method of claim 38 wherein the complementary error correction code includes Y bits, wherein each one of the Y bits of the complementary error correction code is generated by performing a fourth logic operation on bits of the digital word which are not included in the predetermined bit set of the digital word used to generate a corresponding bit of the primary error correction code.

40. The method of claim 37 wherein the M bits of the digital word for error correction are parity bits.

41. The method of claim 37 wherein the predetermined constant signal comprises Z bits, all of which being either all zeros or all ones.

42. The method of claim 41 wherein the generated constant signal comprises Z bits and, if no errors are present in the N bits of data in the digital word, the M bits of data in the digital word, the primary error correction code or the complementary error correction code, all of the Z bits of the generated constant signal are either all zeros or all ones.

43. The method of claim 42 wherein the first logic operation is an XOR operation.

44. The method of claim 43 wherein the second logic operation is an XOR operation.

45. The method of claim 44 wherein the third logic operation is one of an XOR operation and an XNOR operation.

46. The method of claim 45 wherein the fourth logic operation is one of an XOR operation and an XNOR operation.

47. The method of claim 39 wherein if no errors are present in the N bits of the digital word, the complementary error correcting code is either identical to the primary error correcting code or complement to the first error correcting code.

48. The method of claim 39 wherein if no errors are present in the N bits of the digital word, the digital signature comprises either all zeros or all ones.

49. The method of claim 48 wherein if the N bits of the digital word are even, and if no errors are present in the N bits of the digital word, the digital signature comprises all zeros.

50. The method of claim 49 wherein if the N bits of the digital word are odd, and if no errors are present in the N bits of the digital word, the digital signature comprises all ones.

51. The method of claim 47 wherein if the N bits of the digital word are even, and if no errors are present in the N bits of the digital word, the complementary error correcting code is identical to the first error correcting code.

52. The method of claim 47 wherein if the N bits of the digital word are odd, and if no errors are present in the N bits of the digital word, the complementary error correcting code is the complement of the first error correcting code.

53. The method of claim 35 further comprising:

F. performing a second logic operation on the data signature and the M bits of the digital word to generate a constant signal representing a comparison of the data signature and the M bits of the digital word; and G. determining that an error has occurred in the N bits of data in the digital word, the M bits of data in the digital word, the primary error correction code or the complementary error correction code if the generated constant signal comprises zeroes and ones.

54. The method of claim 35 wherein step E comprises determining that an error has occurred in the N bits of data in the digital word, the primary error correction code or the second error correction code if the data signature comprises zeroes and ones.

* * * * *